US011268736B2

(12) United States Patent
Pierres et al.

(10) Patent No.: US 11,268,736 B2
(45) Date of Patent: Mar. 8, 2022

(54) SHUT-OFF FLAP AND CORRESPONDING HEATING, VENTILATION AND/OR AIR CONDITIONING INSTALLATION

(71) Applicant: Valeo Systemes Thermiques, Le Mesnil-Saint-Denis (FR)

(72) Inventors: Philippe Pierres, Le Mesnil Saint-Denis (FR); Nestor Varela, Le Mesnil Saint-Denis (FR); Pauline Cavagna, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 200 days.

(21) Appl. No.: 16/484,540

(22) PCT Filed: Feb. 8, 2018

(86) PCT No.: PCT/FR2018/050310
§ 371 (c)(1),
(2) Date: Aug. 8, 2019

(87) PCT Pub. No.: WO2018/146425
PCT Pub. Date: Aug. 16, 2018

(65) Prior Publication Data
US 2020/0018516 A1 Jan. 16, 2020

(30) Foreign Application Priority Data
Feb. 8, 2017 (FR) ...................................... 1751042

(51) Int. Cl.
*F24F 13/14* (2006.01)
*B60H 1/00* (2006.01)

(52) U.S. Cl.
CPC ......... *F24F 13/14* (2013.01); *B60H 1/00664* (2013.01)

(58) Field of Classification Search
CPC ............................ F24F 13/14; B60H 1/00664
(Continued)

(56) References Cited

U.S. PATENT DOCUMENTS

2008/0168965 A1* 7/2008 Shimura ................. F02D 9/108
123/337
2014/0261822 A1 9/2014 Haupt et al.

FOREIGN PATENT DOCUMENTS

CN   205641415 U   10/2016
DE   102014211704 A1   12/2015
(Continued)

OTHER PUBLICATIONS

International Search Report and Written Opinion in corresponding International Application PCT/FR2018/050310, dated Apr. 17, 2018 (12 pages).
(Continued)

*Primary Examiner* — Allen R. B. Schult
(74) *Attorney, Agent, or Firm* — Osha Bergman Watanabe & Burton LLP (57) ABSTRACT

The present invention relates to a damper door (1) having an axis of rotation (3), a first face (5), and a second face opposite the first face (5), said first (5) and second faces of the damper door (1) defining a plane, said damper door (1) comprising: a rotation shaft (9) projecting from each side of the plane defined by the first (5) and second faces of the damper door (1), and at least one side wall (11) having a flat surface arranged radially with respect to the rotation shaft (9), characterised in that the rotation shaft (9) has, in the plane of the at least one side wall (11), a semi-elliptical shape (13) extending over the side wall (11) and comprising a large diameter (G1) coinciding with the axis of rotation (3) of the damper door (1) and a small radius (P1) parallel to the plane of the at least one side wall (11).

13 Claims, 4 Drawing Sheets

(58) Field of Classification Search
USPC .......................................................... 454/318
See application file for complete search history.

(56) References Cited

FOREIGN PATENT DOCUMENTS

| | | | |
|---|---|---|---|
| EP | 1826043 A1 | | 8/2007 |
| EP | 2631098 A1 | | 8/2013 |
| FR | 2959167 A1 | | 10/2011 |
| JP | 2004026069 A | * | 1/2004 |
| JP | 2008100606 A | | 5/2008 |
| JP | 2008-273234 A | | 11/2008 |
| WO | 2015/071340 A1 | | 5/2015 |

OTHER PUBLICATIONS

The Second Office Action issued in Chinese Patent Application No. 201880010857.8, dated Apr. 26, 2021 (15 pages).

* cited by examiner

SHUT-OFF FLAP AND CORRESPONDING HEATING, VENTILATION AND/OR AIR CONDITIONING INSTALLATION

The present invention relates to the field of heating, ventilation and/or air conditioning installations. More specifically, the invention relates to the field of airflow shut-off flaps intended to be fitted in such installations.

In the automotive field, it is frequent for a vehicle to be fitted with a heating, ventilation and/or air conditioning installation in order to regulate the aerothermal parameters of the air contained in the vehicle interior by distributing the air through the vehicle interior. Such an installation is often known by the abbreviation HVAC, which stands for "heating, ventilation and air conditioning". Nowadays, the user of a vehicle comprising such an installation is able to define zones of the interior toward which he wishes the heating, ventilation and/or air conditioning installation to blow air. To this end, such installations are equipped with shut-off flaps, also referred to as airflow controllers.

The shut-off flaps generally have two main functions: of distributing air when it enters and through the interior according to the preferences of the user of the vehicle, on the one hand, and contributing to sealing off the air ducts on the other hand.

These shut-off flaps are subjected to two main forces: the pressure of the air circulating in the heating, ventilation and/or air conditioning installation, and torsional forces when the shut-off flaps are preventing the airflow from exiting toward the vehicle interior, for example according to user preferences.

At the present time, the weight and size of such shut-off flaps are two important criteria. Specifically, with the goal of reducing vehicle energy consumption, it is necessary to optimize the weight of each of its components. This weight optimization generally leads to a reduction in the sizes and thickness of the various components, this reduction in size or in thickness needing to be achieved without prejudice to the reliability and strength of the components. Finally, a last important criterion is the costs of manufacturing such an installation and therefore the costs of manufacturing each of the components thereof, this cost reduction needing to be done without prejudice to the quality and reliability of the heating, ventilation and/or air conditioning installation.

In general, the shut-off flap needs to be stiff enough that it is able to withstand the air pressure brought about by the use of the heating, ventilation and/or air conditioning installation. This is because if the flap were to bend, that could give rise to undesirable air leaks in the installation. Furthermore, the shut-off flap must not deform or even break under the effect of the torsion forces. In order to prevent these disadvantages, shut-off flaps generally comprise reinforcing parts. However, these reinforcing parts have an impact on the weight, size or even cost of production of such shut-off flaps.

EP 1826043 discloses a shut-off flap of wavy shape, notably made up of reinforcing elements perpendicular to the axis of rotation of the shut-off flap.

However, the stiffness of this shut-off flap can still be improved so that it may offer better resistance to torsion loading in particular.

Document US 2014/0261822 also discloses a shut-off flap the stiffness of which has been improved in order to be better able to withstand the various forces to which it will be subjected. This shut-off flap has a wavy shape and cross sections some parallel and others perpendicular to the axis of rotation thereof so as to give it better stiffness.

However, such a shut-off flap exhibits a certain degree of complexity because its stiffness is conferred by the intersection of the various cross sections. It would also appear to have a relatively high cost of manufacture. Furthermore, such a shut-off flap appears to be dependent on the heating, ventilation and/or air conditioning installation in which it is intended to be installed. If it would therefore appear necessary to set up fairly lengthy and complex experimental schedules in order to determine the sizes and the dimensions of the various cross sections in order to develop a shut-off flap such as this that is optimized from various heating, ventilation and/or air conditioning installations having diverse and varied sizes. Thus, such a shut-off flap does not appear to be able to allow the costs of manufacture to be limited, nor even to allow a reduction in the weight of such an installation.

It is therefore an objective of the invention to at least partially alleviate the prior art problems set forth hereinabove by proposing a shut-off flap, notably for a heating, ventilation and/or air conditioning installation, the mass of which is optimized and of which the strength, notably the ability to withstand torsion loadings, is at least equivalent to that of the shut-off flaps of the prior art.

Another objective of the invention, independent of the foregoing objectives, is to propose a shut-off flap the production costs of which are optimized.

To this end, in order to achieve at least one of the aforementioned objectives at least in part, one subject of the present invention is an airflow shut-off flap having a rotation axle, a first face and a second face opposite to the first face, said first and second faces of the shut-off flap defining a plane, said shut-off flap comprising:
 a rotation shaft projecting on each face of the plane defined by the first and second faces of the shut-off flap, and
 at least one lateral wall having a planar surface of substantially parallelepipedal shape arranged radially with respect to the rotation shaft,
 characterized in that the rotation shaft has, in the plan of the at least one lateral wall, a half-ellipse shape extending along said at least one lateral wall, said half-ellipse shape comprising a major diameter that coincides with the rotation axle of the shut-off flap and a minor radius parallel to the plane of the at least one lateral wall.

The presence of the rotation shaft of half-ellipse shape, which in other words means that the rotation shaft has a surface in the shape of a half ellipse, makes it possible to obtain a shut-off flap of minimum thickness while at the same time maintaining a good ability to withstand the forces to which said shut-off flap will be subjected in a way intrinsic to its use, such as, for example, torsion forces, or else those associated with the pressure of the air circulating in the ventilation canal.

Obtaining a flap of minimal thickness makes it possible to reduce the mass of this flap in comparison with the known shut-off flaps. That then makes it possible to reduce the mass of the heating, ventilation and/or air conditioning installation comprising such shut-off flaps.

In addition, the shape of the rotation shaft makes it possible to prevent the risks of deformation or breakage of the shut-off flap so as to keep the heating, ventilation and/or air conditioning installation in optimum working order thanks to the good distribution of these forces over the rotation shaft.

The shut-off flap according to the present invention may further comprise one or more of the following features considered alone or in combination.

The major diameter of the rotation shaft is comprised between 65% and 100% of the total length of the shut-off flap, preferably comprised between 80% and 100% of the total length of the shut-off flap, and the minor radius of the rotation shaft is comprised between 50% and 100% of the total width of the shut-off flap.

The first face has at least one first row of removals of material and the second face of the shut-off flap has at least one second row of removals of material, said rows of removals of material being positioned at the level of the rotation shaft parallel to the rotation axle of the shut-off flap, said removals of material corresponding to blind orifices.

The first row of removals of material and the second row or removals of material are arranged in alternation on the first face and on the second face of the shut-off flap.

According to an alternative form, the removals of material have a depth greater than or equal to 50% of the thickness of the rotation shaft, and preferably comprised between 75 and 95% of the thickness of the rotation shaft.

The rotation shaft also has at least one longitudinal rib positioned substantially at the center of the removals of material and parallel to the major diameter of the rotation shaft.

According to an alternative form, the longitudinal rib has a height equal to the thickness of the rotation shaft at that point.

The rotation shaft has a first row of removals of material comprising a first longitudinal rib positioned at the level of the rotation axle of the shut-off flap on the first face of the shut-off flap and a second row of removals of material comprising a second longitudinal rib arranged on the second face of the shut-off flap in a manner offset from the rotation axle of the shut-off flap.

According to one particular embodiment, the at least one lateral wall comprises at least one radial rib extending perpendicular to the rotation axle of said shut-off flap, said radial rib starting at the level of a peripheral end of the lateral wall opposite to the rotation axle of the shut-off flap and extending as far as the periphery of the rotation shaft.

According to an alternative form of this embodiment, the at least one lateral wall has at least three radial ribs equidistant from one another.

Alternatively, the shut-off flap comprises two lateral walls and a rotation shaft of half-ellipse shape extending on each of the lateral walls on either side of the rotation axle of the shut-off flap.

According to this alternative, the first and second faces of the shut-off flap each exhibit axial symmetry with respect to the major diameter of the rotation shaft.

According to one particular embodiment the removals of material have a substantially parallelepipedal shape, and preferably a diamond shape.

Another subject of the present invention is a heating, ventilation and/or air conditioning installation, characterized in that it comprises at least one shut-off flap as defined hereinabove.

Further features and advantages of the present invention will become more clearly apparent from reading the following description, given by way of illustrative and nonlimiting example, and from studying the attached drawings in which.

In these figures, identical elements bear the same numerical references.

The following embodiments are examples. Although the description refers to one or more embodiments, that does not necessarily mean that each reference applies to that same embodiment, or that the features apply only to one single embodiment. Simple features from different embodiments can also be combined or interchanged to form other embodiments.

In the following description, reference is made to a first and to a second face of the shut-off flap, to a first and to a second longitudinal rib, to a first and to a second row of removals of material, or else to a first and to a second plane of section. This is merely a numbering system for differentiating and naming elements that are similar but not identical. This numbering does not imply any priority of one element over another and such numberings could easily be interchanged without departing from the scope of the present description. Neither does this numbering imply an order in time, for example when assessing how the shut-off flap works.

Meanings of expressions used in the following description:

rotation axle: a physical axle of rotation of the shut-off flap rotating about an imaginary axis of rotation, total length of the flap: the length consisting of the length of the lateral wall of the shut-off flap comprising a peripheral surround and possibly a seal on each side; this length of the lateral wall is parallel to the rotation axle of the shut-off flap, total width of the flap: the width made up of the width of the lateral wall of the shut-off flap, the width of the peripheral surround, and the width of any seal that might be present, this width of the lateral wall is perpendicular to the rotation axle of the shut-off flap, lateral side of the lateral wall: the side of the lateral wall perpendicular to the rotation axle of the shut-off flap, longitudinal side of the lateral wall: the exterior side of the lateral wall parallel to the rotation axle of the shut-off flap, end angle of the lateral wall: the angle formed by the lateral side and the longitudinal side of the shut-off flap, plane of the lateral wall: the plane comprising the lateral wall and the axis of rotation of the shut-off flap, and symmetric: symmetry with respect to a plane passing through the rotation axle and perpendicular to the plane defined by the web of the shut-off flap.

First Exemplary Embodiment

Figure 1A:
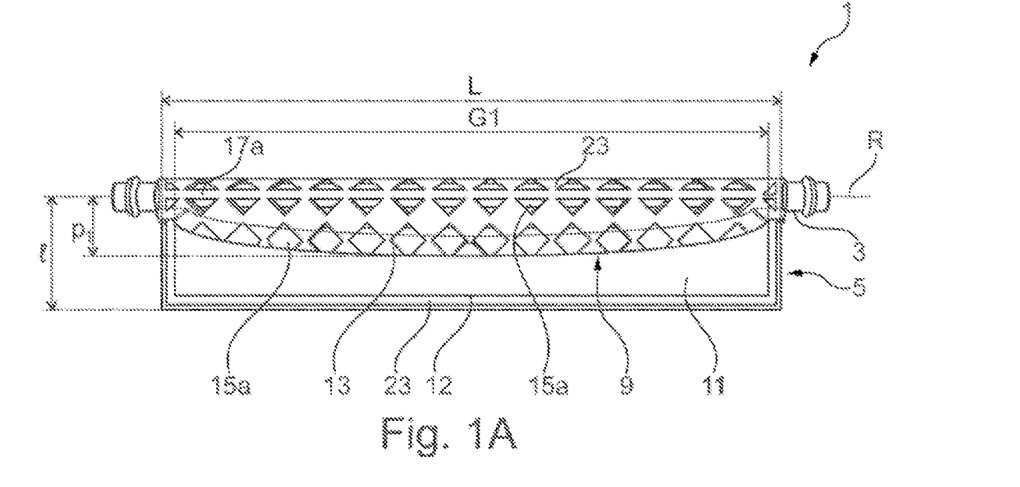
FIG. 1A is a schematic depiction from above of a first face of a shut-off flap having a single lateral wall according to a first embodiment.
Figure 1B:
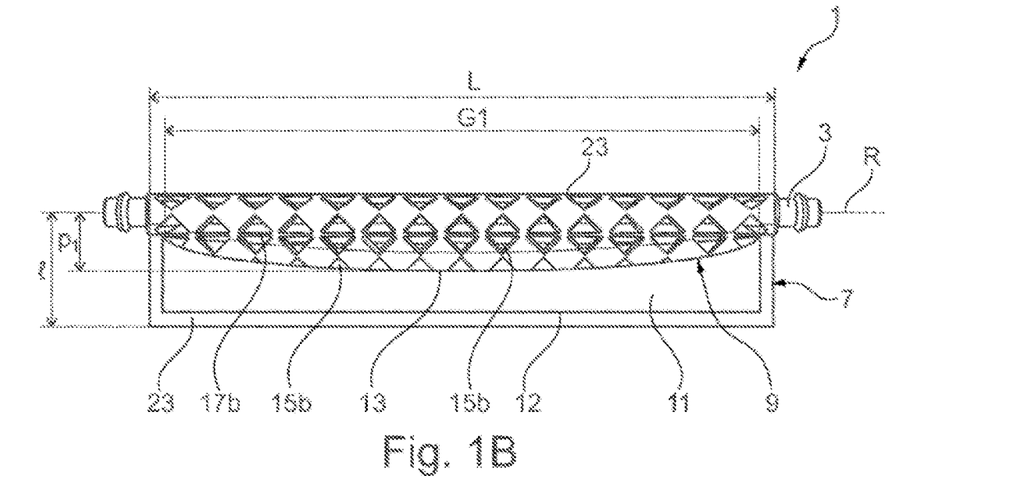
FIG. 1B is a schematic depiction from above of a second face of the shut-off flap of FIG. 1A.

Reference is made to FIGS. 1A and 1B which depict an airflow shut-off flap 1 having a rotation axle 3 rotating about an axis of rotation R, a first face 5 (FIG. 1A), and a second face 7 (FIG. 1B) opposite to the first face 5. According to this example, the first 5 and second 7 faces of the shut-off flap 1 define a plane.

In addition, the shut-off flap 1 further comprises a rotation shaft 9 projecting with respect to each face of the plane defined by the first 5 and second 7 faces of the shut-off flap 1, and at least one lateral wall 11 having a planar surface of substantially parallelepipedal shape arranged radially with respect to the rotation shaft 9. According to this example, the lateral wall 11 has a rectangular shape and comprises a peripheral surround 12 to which a seal 23 may optionally be fitted. The seal 23 is configured to limit as far as possible any air losses that may occur so as to increase the effectiveness of the shut-off flap 1. Specifically, the shut-off flap 1 has the function of either closing or not closing an air duct of the heating, ventilation and/or air conditioning installation. The presence of this seal 23 allows this shut-off function to be improved. According to the particular embodiment depicted here, the shut-off flap 1 has a single lateral wall 11. Such a shut-off flap 1 may also be referred as a "letterbox" flap.

According to the embodiment depicted here, the rotation shaft 9 has, in the plane of the at least one lateral wall 11, a half-ellipse shape 13 extending over said at least one lateral wall 11. Said half-ellipse shape 13 has a major diameter G1 coinciding with the rotation axle 3 of the shut-off flap 1 and a minor radius P1 parallel to the plane of the at least one lateral wall 11. The half-ellipse shape 13 of the rotation shaft 9 makes it possible to increase the ability of the shut-off flap 1 to withstand torsion loadings associated with the flow of air that the shut-off flap 1 is preventing from passing, for example that it might have to experience in a way intrinsic to its use. The presence of this rotation shaft 9 of half-ellipse shape 13 makes it possible to reduce the thickness of the lateral wall 11 and therefore the mass of the shut-off flap 1 while at the same time allowing the lateral wall 11 to maintain a stiffness at least equivalent to that of the lateral walls of the shut-off flaps known from the prior art. The structural integrity of the shut-off flap 1 is therefore preserved because its ability to withstand the various forces it may have to experience is at least equivalent to that of the shut-off flaps known from the prior art.

According to the particular embodiment of FIGS. 1A and 1B, the major diameter G1 of the rotation shaft 9 is comprised between 65% and 100% of the total length L of the shut-off flap 1, and more particularly between 80% and 100% of the total length L of the shut-off flap 1, and the minor radius P1 of the rotation shaft 9 is comprised between 50% and 100% of the total width 1 of the shut-off flap 1. The dimensions of the rotation shaft 9 are large so that the shut-off flap 1 can withstand the various forces it will experience during its use. Specifically, if the dimensions of the half-ellipse shape 13 that makes up the rotation shaft 9 represent less than 65% of the total length L and 50% of the total width 1 of the shut-off flap 1, there is a risk that the shut-off flap 1 will bend or break. If it does, it will no longer be able to perform its role of shutting off an air duct of the heating, ventilation and/or air conditioning installation because it will experience significant aeraulic losses.

According to the particular embodiment depicted here, the first face 5 comprises at least a first row of removals of material 15a and the second face 7 of the shut-off flap 1 have at least one second row of removals of material 15b disposed solely in the rotation shaft 9 and arranged in parallel to the rotation axle 3 of the shut-off flap 1. The removals of material 15a, 15b correspond to blind orifices. According to this particular embodiment, the first face 5 has two first rows of removals of material 15a (FIG. 1A) of which one is positioned at the axis of rotation R and the other is positioned at the periphery of the rotation shaft 9. The second face 7 for its part has a second row of removals of material 15b (FIG. 1B) positioned substantially at the center of the half-ellipse shape 13 of the rotation shaft 9. These removals of material 15a, 15b, disposed solely in the rotation shaft 9, make it possible to reduce the mass of the shut-off flap 1 while at the same time allowing it to maintain a good ability to withstand the various forces that it may have to experience as a result of the presence of the rotation shaft 9 projecting from the lateral wall 11.

According to the particular embodiment depicted here, the removals of material 15a, 15b are arranged in alternation on the first face 5 and on the second face 7 of the shut-off flap 1. More specifically, the rows of removals of material 15a of the first face 5 and the rows of removals of material 15b of the second face 7 are arranged in a manner offset from one another on the faces 5, 7 of the shut-off flap 1, as depicted in greater detail with reference to FIGS. 2C and 2D. Moreover, the removals of material 15a, 15b have a depth P greater than or equal to 50% of the thickness E of the rotation shaft 9, and preferably comprised between 75 and 95% of the thickness E of the rotation shaft 9, as also depicted with reference to FIGS. 2C and 2D.

According to the particular embodiment of FIGS. 1A and 1B and optionally, the rotation shaft 9 also has at least one longitudinal rib 17 positioned substantially at the center of the removals of material 15a, 15b and parallel to the major diameter G1 of the rotation shaft 9. More specifically, the rotation shaft 9 has a first row of removals of material 15a comprising a first longitudinal rib 17a positioned at the rotation axle 3 of the shut-off flap 1 on the first face 5 of the shut-off flap 1 (FIG. 1A) and a second row of removals of material 15b comprising a second longitudinal rib 17b positioned on the second face 7 of the shut-off flap 1 in a manner offset from the rotation axle 3 of the shut-off flap 1 (FIG. 1B). The presence of these first 17a and second 17b longitudinal ribs also contribute to increasing the ability of the shut-off flap 1 to withstand the various forces it may have to experience, notably torsion loading.

Thus, such a shut-off flap 1 of the "letterbox" type can be used to either shut off or not shut off ventilation ducts in a heating, ventilation and/or air conditioning installation in order to make it possible to reduce its overall mass without prejudice to the correct operation of this installation.

Second Exemplary Embodiment

Reference is made to FIGS. 2A to 2D which depict a shut-off flap 1 comprising two lateral walls 11 and a rotation shaft 9 of half-ellipse shape 13 for each lateral wall 11 extending on either side of the rotation axle 3 of the shut-off flap 1. The rotation shaft 9 here has the shape of an ellipse given that there are two lateral walls 11 and that the rotation shaft 9 has a shape, or a surface in the shape of a half-ellipse 13 for each lateral wall 11. It is also possible to conceive of a shut-off flap 1 comprising two lateral walls 11 and a rotation shaft 9 of half-ellipse shape 13 for the two lateral walls 11. Such a shut-off flap 1 may also be referred to as a butterfly flap. The use of such a shut-off flap 1, during operation of the heating, ventilation and/or air conditioning installation, may allow various air inlets or outlets to be shut off alternately. The shut-off flap 1 according to this second example comprises the same elements as the "letterbox" flap described earlier. In order not to overburden the description, only the additional elements are described here.

Figure 2A:
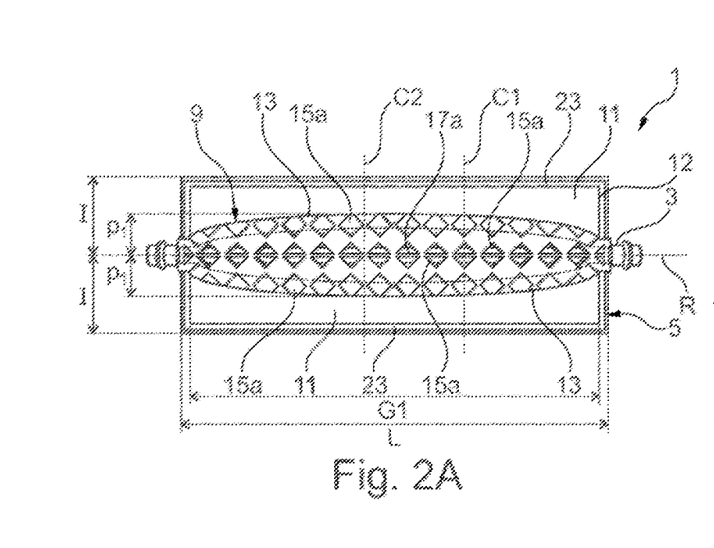
FIG. 2A is a schematic depiction from above of a first face of a shut-off flap having two lateral walls according to a second embodiment.
Figure 2B:
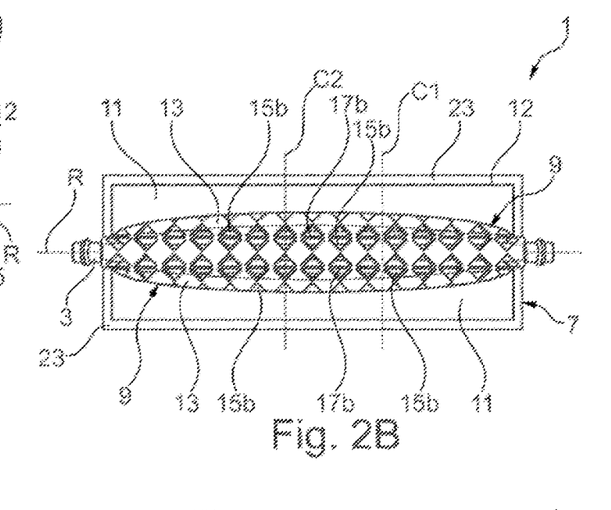
FIG. 2B is a schematic depiction from above of a second face of the shut-off flap of FIG. 2A.

According to this second embodiment, the first 5 and second 7 faces of the shut-off flap 1 each have axial symmetry with respect to the major diameter G1 of the rotation shaft 9 of the shut-off flap 1. Moreover, the removals of material 15a, 15b have a substantially parallelepipedal shape, and more particularly the shape of a diamond according to this embodiment.

According to this second embodiment, the first face 5 has a first longitudinal rib 17a and the second face 7 of the shut-off flap 1 has two second longitudinal ribs 17b positioned on either side of the rotation axle 3 of the shut-off flap 1.

Figure 2C:
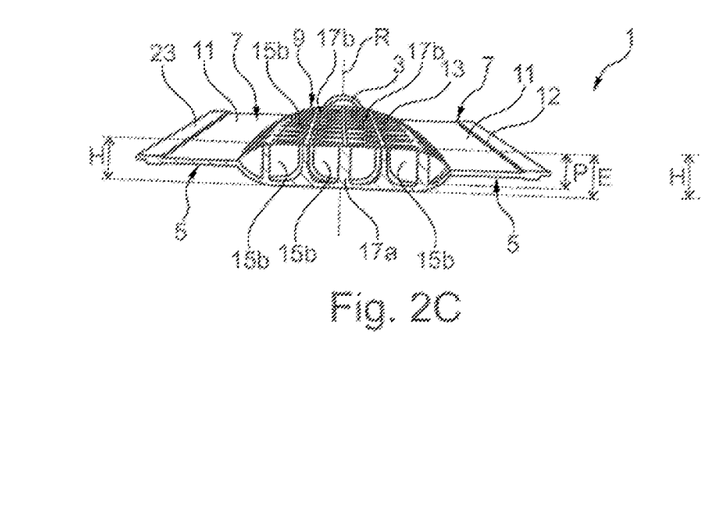
FIG. 2C is a schematic depiction in cross section on a first plane of section and in perspective of the shut-off flap of FIG. 2A.
Figure 2D:
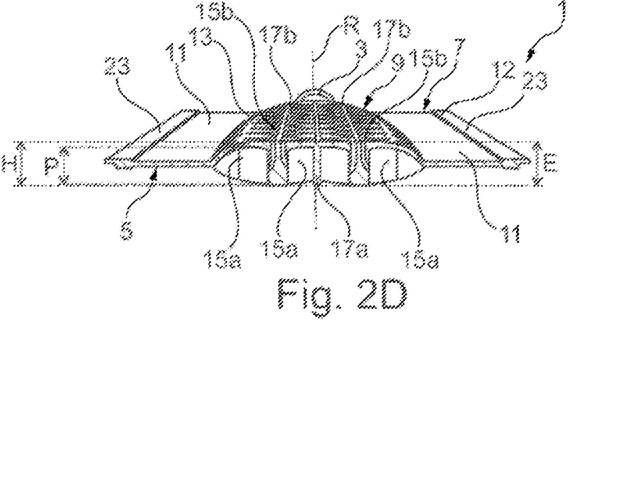
FIG. 2D is a schematic depiction in cross section on a second plane of section and in perspective of the shut-off flap of FIG. 2A.

Reference is made to FIGS. 2C and 2D which depict the shut-off flap 1 in cross section according to this second exemplary embodiment. More specifically, FIG. 2C corresponds to the cross section of the shut-off flap on a first plane of section C1 (visible in FIGS. 2A and 2B). The first plane of section C1 passes through the middle of the removals of material 15a of the first face 5 of the shut-off flap 1 parallel to the minor radius P1 of the half-ellipse shape 13 of the rotation shaft 9. Moreover, FIG. 2D corresponds to the cross section of the shut-off flap 1 according to a second plane of section C2 (visible in FIGS. 2A and 2B). The second plane of section C2 passes through the middle of the removals of material 15b of the second face 7 of the shut-off flap 1 parallel to the minor radius P1 of the half-ellipse shape 13 of the rotation shaft 9. These FIGS. 2C and 2D provide a better illustration of the alternating layout of the removals of material 15a, 15b on the first 5 and second 7 faces of the shut-off flap 1 and their dimensions and the dimensions of the longitudinal ribs 17 likewise present on the first 5 and second 7 faces of the shut-off flap 1.

With reference to FIGS. 2C and 2D, the removals of material 15a (visible in FIG. 2D) from the first face 5 are positioned in alternation with respect to the removals of material 15b (visible in FIG. 2C). What is meant here by in alternation is that the removals of material 15a of the first face 5 do not overlap the removals of material 15b of the second face 7. More specifically, the removals of material 15a from the first face 5 and the removals of material 15b from the second face 7 are positioned on the rotation shaft 9 in a manner that is offset from one another across the width 1 of the shut-off flap 1. Moreover, according to the particular embodiment depicted here, the removals of material 15a, 15b have a depth P comprised between 75 and 95% of the thickness E of the rotation shaft 9 at the level of the rotation axle 3. Advantageously, the removals of material 15a, 15b make it possible to reduce the mass of the shut-off flap 1 as far as possible without prejudice to the ability of the shut-off flap 1 to withstand the various forces it will experience during its use. According to the particular exemplary embodiment depicted here, the rotation shaft 9 at the level of the bottom of the removals of material 15a, 15b have a thickness substantially equal to the thickness of the lateral wall 11 of the shut-off flap 1.

In addition, the longitudinal ribs 17 preferably have a height H equal to the thickness E of the rotation shaft 9 where commonly located with the rotation shaft 9.

Third Exemplary Embodiment

Figure 3A:
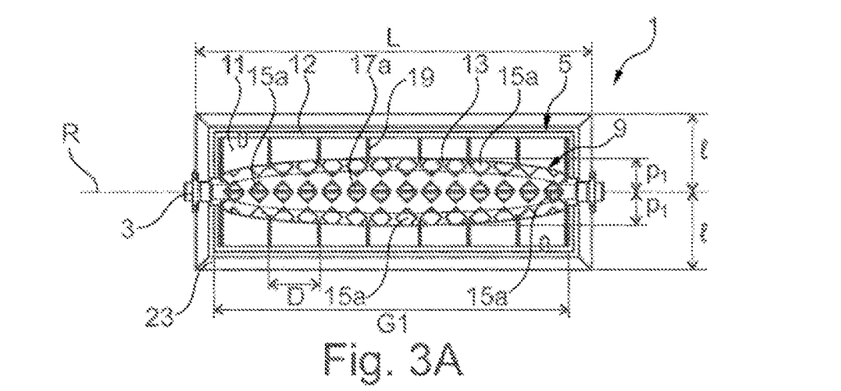
FIG. 3A is a schematic depiction from above of a first face of a shut-off flap according to a third embodiment.
Figure 3B:
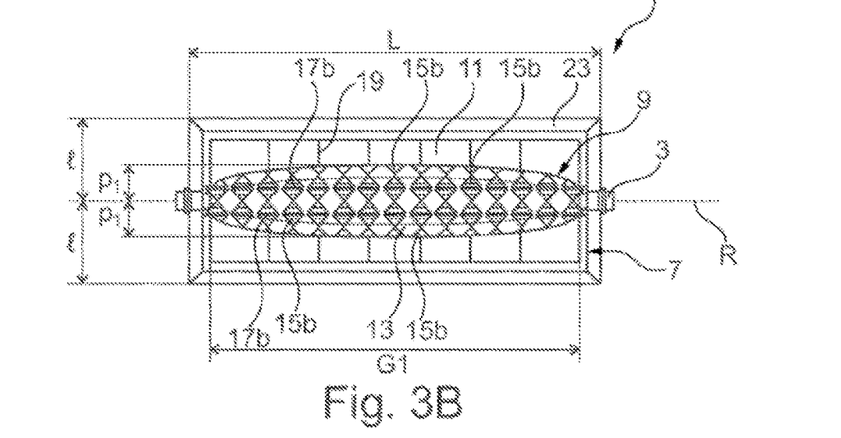
FIG. 3B is a schematic depiction from above of a second face of the shut-off flap of FIG. 3A.
Figure 3C:
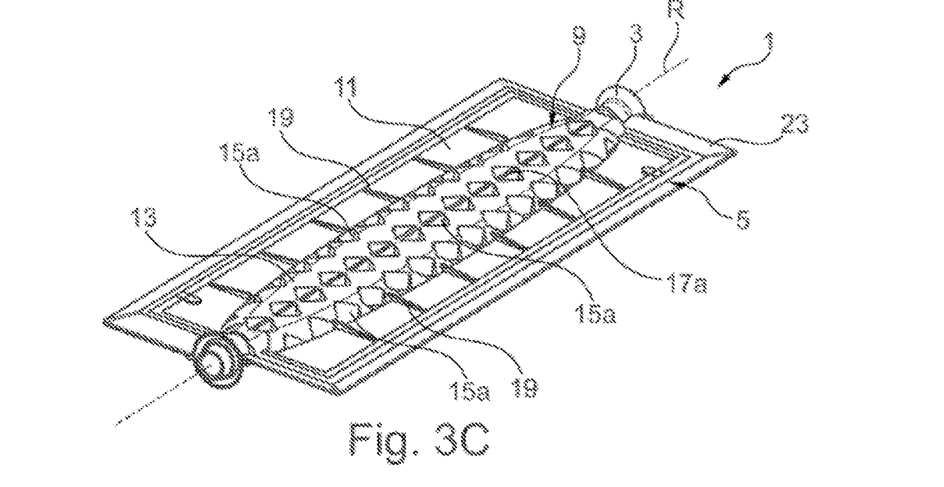
FIG. 3C is a schematic depiction in perspective of the first face of the shut-off flap of FIG. 3A.

Reference is made to FIGS. 3A to 3C which depict a shut-off flap 1 of the butterfly type. In this third embodiment, all of the elements that feature in the second embodiment described hereinabove are present. In order not to overload the description, only the additional elements are described here.

In this example, each lateral wall 11 optionally comprises at least one radial rib 19 extending at right angles to the rotation axle 3 of said shut-off flap 1. This radial rib 19 starts at a peripheral end of the lateral wall 11 opposite to the rotation axle 3 of the shut-off flap 1, and more precisely at the level of the peripheral surround 12 of the lateral wall 11. The radial rib 19 extends as far as the periphery of the half-ellipse shape 13 of the rotation shaft 9. According to the particular embodiment described here, each lateral wall 11 has a plurality of radial ribs 19 equidistant from one another and separated by a distance D. According to the preferred embodiment depicted here, the shut-off flap 1 has six radial ribs 19 equidistant from one another. This distribution of the various radial ribs 19 allows the good distribution of the torsion forces for example over each radial rib 19 to complement the distribution of forces that occurs along the rotation shaft 9, thereby contributing to the stiffening of the lateral walls 11 and therefore the stiffening of the shut-off flap 1. This distribution of the radial ribs 19 therefore contributes to increasing the strength of the shut-off flap 1, notably its ability to withstand the torsion forces.

With reference to FIG. 3C, the radial ribs 19 have a thickness that is variable with respect to the plane defined by the lateral wall 11. More specifically, the radial ribs 19 have a thickness substantially equal to that of the peripheral surround 12 at the level of their end in contact with the peripheral surround 12 of the lateral wall 11, and a thickness substantially equal to that of the rotation shaft 9, at the level of the periphery of the half-ellipse shape 13, at the level of their end in contact with the periphery of the rotation shaft 9. This variability in the thickness of the radial ribs 19 also contributes to increasing the stiffness of the lateral walls 11 of the shut-off flap 1.

According to another embodiment which has not been depicted here, the radial ribs 19 are arranged on the first 5 and the second 7 faces of a shut-off flap 1 of the "letterbox" type, namely of the type having just one lateral wall 11. According to this embodiment, the shut-off flap 1 has a plurality of radial ribs 19 equidistant from one another.

According to another embodiment not depicted here, the radial ribs 19 have a thickness that is constant over the entirety of the lateral wall 11. This constant thickness may, for example, correspond to the thickness of the peripheral surround 12.

Fourth Exemplary Embodiment

Figure 4A:
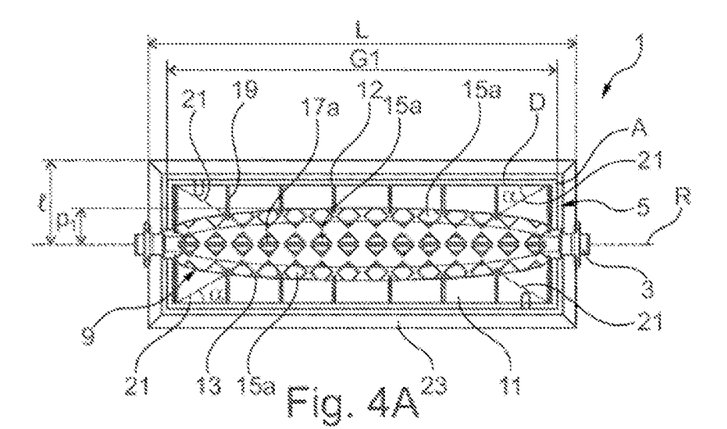
FIG. 4A is a schematic depiction from above of a first face of a shut-off flap according to a fourth embodiment.
Figure 4B:
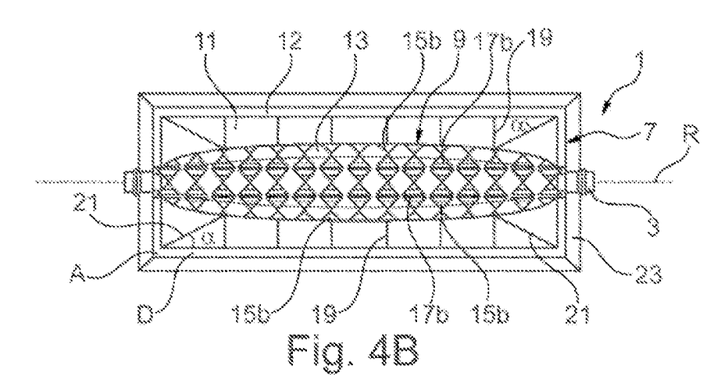
FIG. 4B is a schematic depiction from above of a second face of the shut-off flap of FIG. 4A.
Figure 4C:
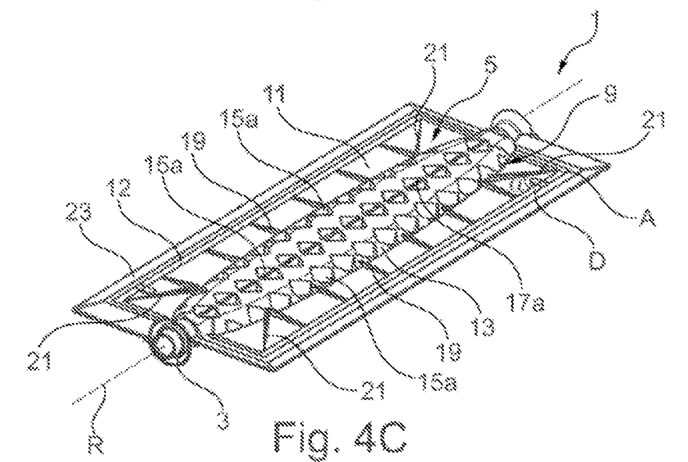
FIG. 4C is a schematic depiction in perspective of the first face of the shut-off flap of FIG. 4A.

Reference is made to FIGS. 4A to 4C which depicts a shut-off flap 1 of the butterfly type. In this fourth embodiment, all of the elements of the third embodiment described hereinabove are present. As before, in order not to overburden the description, only the additional elements are described here.

According to this example, the first 5 and second 7 faces of the lateral wall 11 optionally have two diagonal ribs 21. Each diagonal rib 21 extends from an end corner A of the lateral wall 11 toward the rotation axle 3 of the shut-off flap 1 and makes an angle a comprised between 20° and 60° with a longitudinal side D of the lateral wall 11. According to the particular embodiment depicted here, the diagonal ribs 21 extend as far as the intersection between the radial rib 19 closest to the end corner A from which the diagonal rib 21 extends and the periphery of the rotation shaft 9.

Advantageously, the presence of a diagonal rib 21 at each end corner A of the lateral wall 11 on the first face 5 and on the second face 7 of the shut-off flap 1 stiffens the end corners A of the lateral wall 11 when it is subjected to high pressures for example so that it is not made to twist or bend. Thus, the diagonal ribs 21 also contribute to increasing the stiffness of the shut-off flap 1 and therefore its ability to withstand the various forces it may experience as a result of its use in a heating, ventilation and/or air conditioning installation.

With reference to FIG. 4C, the diagonal ribs 21, just like the radial ribs 19, have a thickness that is variable with respect to the plane of the lateral wall 11. More specifically, the diagonal ribs 21 have a thickness substantially equal to the thickness of the peripheral surround 12 at the end corner A of the lateral wall 11 and a thickness substantially equal to that of the rotation shaft 9 where it intersects with the radial rib 19. This variability in the thickness of the diagonal ribs 21 likewise contributes to increasing the strength of the lateral walls 11, notably their ability to withstand torsion loadings, and therefore to increasing the stiffness of the shut-off flap 1.

According to another embodiment not depicted here, the shut-off flap 1 has two lateral walls 11 on which only the diagonal ribs 21 are present.

According to yet another embodiment not depicted here, the diagonal ribs 21 have a constant thickness. This constant thickness may for example be equal to the thickness of the peripheral surround 12 of the lateral wall 11.

According to an alternative form not depicted here, the shut-off flap 1 corresponds to a flap of the "letterbox" type. According to this alternative form, the shut-off flap 1 has on its first 5 and second 7 face a diagonal rib 21 arranged at the end corners A of the lateral wall 11. According to this alternative form, the radial ribs 19 may be present or absent.

These exemplary embodiments are provided by way of illustrative and nonlimiting examples. Specifically, it is entirely possible for a person skilled in the art, without departing from the scope of the present invention, to alter the geometric shape of the removals of material, to have them adopt any shape other than a substantially parallelepipedal shape, such as, for example, circular shapes. Moreover, a person skilled in the art could remove materials from only the first face of the shut-off flap or from only the second face of the shut-off flap without departing from the scope of the present invention. Likewise, the person skilled in the art could use a shut-off flap having radial or diagonal ribs on just one face of the shut-off flap in order to obtain a shut-off flap exhibiting improved properties of ability to withstand the various stresses, or could even design a shut-off flap exhibiting symmetry with respect to the rotation axle in the case of the removals of material but not in the case of the diagonal or radial ribs.

Thus, reducing the mass of a shut-off flap 1 while at the same time allowing it to maintain a good ability to withstand the forces that it experiences during use, such as the pressure forces or else torsion forces for example, is possible by virtue of the shut-off flap 1 having one or more lateral walls 11 and a rotation shaft 9 extending at least partially on said at least one of these lateral walls 11 as described hereinabove.

The invention claimed is:

1. An airflow shut-off flap having a rotation axle, a first face and a second face opposite to the first face, said first and second faces of the shut-off flap defining a plane, said shut-off flap comprising:
   a rotation shaft projecting on each face of the plane defined by the first and second faces of the shut-off flap; and
   at least one lateral wall having a planar surface of substantially parallelepipedal shape arranged radially with respect to the rotation shaft;
   wherein the rotation shaft has, in the planar surface of the at least one lateral wall, a half-ellipse shape extending along said at least one lateral wall, said half-ellipse shape comprising a major diameter that coincides with the rotation axle of the shut-off flap and a minor radius parallel to the planar surface of the at least one lateral wall;
   wherein the first face has at least one first row of blind orifices and the second face of the shut-off flap has at least one second row of blind orifices;
   wherein said rows of blind orifices are disposed solely in the rotation shaft and are arranged in parallel to the rotation axle of the shut-off flap; and
   wherein the rotation shaft also has at least one longitudinal rib positioned substantially at a center of at least one of the rows of the blind orifices and parallel to the major diameter of the rotation shaft;
   the at least one longitudinal rib comprising a first longitudinal rib and a second longitudinal rib;
   the at least one first row of blind orifices including the first longitudinal rib;
   the first longitudinal rib being positioned at the rotation axle of the shut-off flap on the first face of the shut-off flap;
   the at least one second row of blind orifices including the second longitudinal rib; and
   the second longitudinal rib being positioned on the second face of the shut-off flap in a manner offset from the rotation axle of the shut-off flap.

2. The shut-off flap as claimed in claim 1, wherein
   the major diameter of the rotation shaft is comprised between 65% and 100% of a total length of the shut-off flap, and
   the minor radius of the rotation shaft is comprised between 50% and 100% of a total width of the shut-off flap.

3. The shut-off flap as claimed in claim 1, wherein the first row of blind orifices and the second row of blind orifices are arranged in alternation on the first face and on the second face of the shut-off flap.

4. The shut-off flap as claimed in claim 3, wherein the blind orifices have a depth (P) greater than or equal to 50% of a thickness of the rotation shaft.

5. The shut-off flap as claimed in claim 1, wherein the first longitudinal rib and the second longitudinal rib have respective heights equal to a thickness of the rotation shaft where commonly located with the rotation shaft.

6. The shut-off flap as claimed in claim 1, wherein the at least one lateral wall comprises at least one radial rib extending perpendicular to the rotation axle of said shut-off flap, said radial rib starting at a peripheral end of the lateral wall opposite to the rotation axle of the shut-off flap and extending as far as the periphery of the rotation shaft.

7. The shut-off flap as claimed in claim 6, wherein the at least one lateral wall has at least three radial ribs equidistant from one another.

8. The shut-off flap as claimed in claim 1, wherein:
the at least one lateral wall comprises two lateral walls; and
the rotation shaft of half-ellipse shape extends along each of the lateral walls on either side of the rotation axle of the shut-off flap.

9. The shut-off flap as claimed in claim 8, wherein the first and second faces of the shut-off flap each exhibit axial symmetry with respect to the major diameter of the rotation shaft.

10. The shut-off flap as claimed in claim 1, wherein the blind orifices have a substantially parallelepipedal shape.

11. The shut-off flap as claimed in claim 1, wherein said at least one lateral wall is devoid of said blind orifices.

12. A heating, ventilation and/or air conditioning installation, comprising:
at least one shut-off flap having a rotation axle, a first face and a second face opposite to the first face, said first and second faces of the shut-off flap defining a plane, said shut-off flap comprising:
a rotation shaft projecting on each face of the plane defined by the first and second faces of the shut-off flap; and
at least one lateral wall having a planar surface of substantially parallelepipedal shape arranged radially with respect to the rotation shaft;
wherein the rotation shaft has, in the plane of the at least one lateral wall, a half-ellipse shape extending along said at least one lateral wall, said half-ellipse shape comprising a major diameter that coincides with the rotation axle of the shut-off flap and a minor radius parallel to the plane of the at least one lateral wall;
wherein the first face has at least one first row of blind orifices and the second face of the shut-off flap has at least one second row of blind orifices;
wherein said rows of blind orifices are disposed solely in the rotation shaft and are arranged in parallel to the rotation axle of the shut-off flap; and
wherein the rotation shaft also has at least one longitudinal rib positioned substantially at a center of at least one of the rows of the blind orifices and parallel to the major diameter of the rotation shaft;
the at least one longitudinal rib comprising a first longitudinal rib and a second longitudinal rib;
the at least one first row of blind orifices including the first longitudinal rib;
the first longitudinal rib being positioned at the rotation axle of the shut-off flap on the first face of the shut-off flap;
the at least one second row of blind orifices including the second longitudinal rib; and
the second longitudinal rib being positioned on the second face of the shut-off flap in a manner offset from the rotation axle of the shut-off flap.

13. An airflow shut-off flap having a rotation axle, a first face and a second face opposite to the first face, said first and second faces of the shut-off flap defining a plane, said shut-off flap comprising:
a rotation shaft projecting on each face of the plane defined by the first and second faces of the shut-off flap; and
at least one lateral wall having a planar surface of substantially parallelepipedal shape arranged radially with respect to the rotation shaft;
wherein the rotation shaft has, in the planar surface of the at least one lateral wall, a half-ellipse shape extending along said at least one lateral wall, said half-ellipse shape comprising a major diameter that coincides with the rotation axle of the shut-off flap and a minor radius parallel to the planar surface of the at least one lateral wall;
wherein the first face has at least one first row of blind orifices and the second face of the shut-off flap has at least one second row of blind orifices;
wherein said rows of blind orifices are disposed solely in the rotation shaft and are arranged in parallel to the rotation axle of the shut-off flap;
wherein the first row of blind orifices and the second row of blind orifices are arranged in alternation on the first face and on the second face of the shut-off flap.

\* \* \* \* \*